United States Patent
Kobayashi et al.

(10) Patent No.: US 7,662,659 B2
(45) Date of Patent: Feb. 16, 2010

(54) METHODS OF FORMING ARRAYS OF NANOSCALE BUILDING BLOCKS

(75) Inventors: Nobuhiko P. Kobayashi, Sunnyvale, CA (US); Achyut Kumar Dutta, Sunnyvale, CA (US)

(73) Assignee: Banpil Photonics, Inc., Santa Clara, CA (US)

( * ) Notice: Subject to any disclaimer, the term of this patent is extended or adjusted under 35 U.S.C. 154(b) by 246 days.

(21) Appl. No.: 11/161,456

(22) Filed: Aug. 3, 2005

(65) Prior Publication Data

US 2006/0027799 A1      Feb. 9, 2006

Related U.S. Application Data

(60) Provisional application No. 60/522,030, filed on Aug. 4, 2004.

(51) Int. Cl.
*H01L 51/40*      (2006.01)

(52) U.S. Cl. .................. 438/99; 438/962; 257/E29.069; 257/E29.07; 257/E29.071; 257/E29.076; 977/893; 977/789; 977/827; 977/831

(58) Field of Classification Search .................. 438/95, 438/455, 458, 962; 257/E29.071, 14; 977/773, 977/774, 882–886
See application file for complete search history.

(56) References Cited

U.S. PATENT DOCUMENTS

| | | | | |
|---|---|---|---|---|
| 5,747,180 A | * | 5/1998 | Miller et al. | 428/601 |
| 6,830,946 B2 | * | 12/2004 | Yanagisawa et al. | 438/26 |
| 2004/0079278 A1 | * | 4/2004 | Kamins et al. | 117/84 |

* cited by examiner

*Primary Examiner*—Ha Tran T Nguyen
*Assistant Examiner*—Karen M Kusumakar

(57) ABSTRACT

The invention is a method of producing an array, or multiple arrays of quantum dots. Single dots, as well as two or three-dimensional groupings may be created. The invention involves the transfer of quantum dots from a receptor site on a substrate where they are originally created to a separate substrate or layer, with a repetition of the process and a variation in the original pattern to create different structures.

16 Claims, 5 Drawing Sheets

FIG. 4A
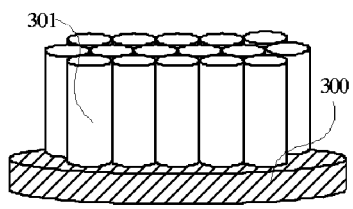
FIG. 4B
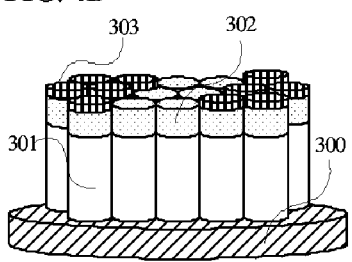
FIG. 4C
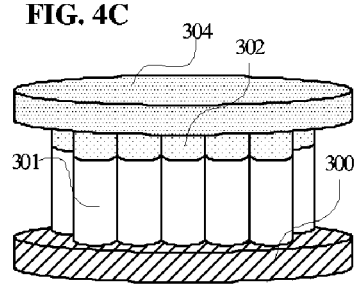
FIG. 4D
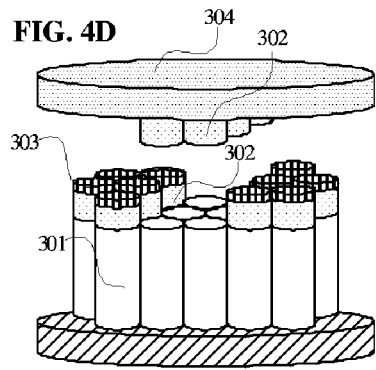
FIG. 4E
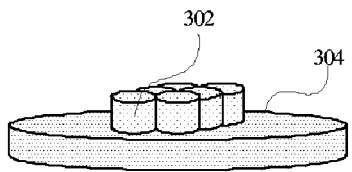
FIG. 4

FIG. 5

METHODS OF FORMING ARRAYS OF NANOSCALE BUILDING BLOCKS

CROSS REFERENCE TO RELATED APPLICATIONS

This application claims the benefit of U.S. Provisional Patent Application No. 60/522,030 filed on Aug. 4, 2004.

FIELD OF INVENTION

This patent specification relates to methods of forming small-scale functional structures. More specifically, it relates to methods of arranging nanoscale building blocks made of atoms and/or molecules into multi-dimensional periodic arrays. Also, it also relates to transferring of the nano-array having uniform size distribution and density for novel optical and electronics devices.

BACKGROUND ART

As the miniaturization of synthesized functional structures that possess electrical, optical and mechanical functionalities continues to progress rapidly, fabrication techniques based on conventional multi-steps of photolithography and subsequent etching processes appear to be approaching to their practical limits quickly. In the quest for discovering alternative techniques to such "top-down" approaches in which bulk materials are engraved into small-scale functional structures, the concept based on "bottom-up" approaches in which small-scale functional structures are formed by spatially arranging nanoscale building blocks, e.g. atoms and/or molecules, on given foreign substrates have been gaining significant attentions.

One of the bottom-up approaches that have been explored extensively in the past ten years is spontaneous self-assembled quantum dot, in particular, coherent, i.e. free from structural defects, small semiconductor inclusions, with a linear order of several tenths of nanometers, in a semiconductor matrix. However, inherent challenges associated with various formation techniques of spontaneous self-assembled quantum dots (SAQDs) have been hindering them from being prosperous approaches to synthesize small-scale functional structures.

As the term "spontaneous" indicates, the lack of control on specifically positioning SAQDs into densely-packed multi-dimensional periodic arrays has been a serious issue that needs to be aggressively addressed to ensure flexible tuning of physical properties of the small-scale functional structures consisting of SAQDs. One of diverse approaches that result in arranging SAQDs into periodic arrays, to some extent, as in prior art [T. I. Kamins and R. S. Williams, Appl. Phys. Lett. 71, 1201 (1997)] schematically shown in FIGS. 1A-1C, is to use engineered strain field generated by pre-formed three-dimensional structures. In FIG. 1A, a starting substrate 1 is a standard substrate having flat surface. Then, as in FIG. 1B, the starting substrate 1 is pre-patterned to create a mesa structure 2. Appropriately designed three-dimensional geometry of the mesa structure 2 provide narrow regions where the formation of SAQDs 3 is energetically favorable, thus SAQDs 3 form along the mesa top as in FIG. 1C. Although this approach can result in positioning SAQDs 3 in a particular geometrical arrangement, this does not seem to be a feasible way to obtain a densely-packed array because the formation of SAQDs 3 is spatially limited within small regions around the generated strain field. In another prior art (not shown here), an energetic beam consisting of charged particles such as ions can be used to create regions where the formation of SAQDs is energetically enhanced, however, this process would be time-consuming and/or very expensive.

Another intrinsic limitation in the formation of SAQDs relates to single crystal substrates on which SAQDs are, in most of cases, formed. Since semiconductor SAQDs are formed under the influence of mechanical strain generated by physical mismatches between a SAQDs material and a substrate material, the substrate necessarily need to be single crystal, putting substantial limitations in terms of choosing substrate materials.

On the other hand, organic nanoscale templates for the formation of arrays of nanoscale building blocks are being developed using both artificial and natural materials such as block copolymers, DNA, bacteria, virus, phage and proteins, all of which, unlike semiconductor SAQDs, have a built-in capability of arranging their organic nanoscale building blocks into two-dimensional arrays on a wide range of substrates. These organic nanoscale templates can apparently be used to arrange foreign inorganic nanoscale building blocks, e.g. semiconductor QDs, into two-dimensional arrays characterized by the original organic nanoscale templates. However, as in a prior art [R. A. Mcmillan, et al, "*Ordered nanoparticle arrays formed on engineered chaperonin protein templates*", Nature Materials 1, 247 (2002).], general incompatibilities in physical properties of such organic nanoscale templates when incorporated as a part of functional device consisting of arrayed inorganic nanoscale building blocks clearly indicate that organic nanoscale templates eventually need to be removed.

Therefore, it would be desirable to have a capability of transferring an array of nanoscale building blocks from an original substrate on which the array is preferably formed using a nanoscale template to another substrate on which only the array of nanoscale building blocks resides eventually. It would be further desirable to have a capability of arranging many arrays of nanoscale building blocks into three-dimensional structures. These are necessary to fabricate the novel devices (optical and electrical) having significantly high performances as compared with the bulk-based or non-uniform quantum dot based devices.

BRIEF SUMMARY

Accordingly, it is an object of the invention to provide the technique to transfer the uniformly distributed quantum dots to the separate substrate by using of which novel devices can be fabricated.

According to this invention, it is an object to provide the techniques or methods to create the multi-dimensional quantum dots on single or plurality of layers by transferring from another substrate.

It is an object of this invention to provide the manufacturing process of the uniformly distributed quantum dots having pre selected size-distribution and density on the flexible substrate for high performance novel devices.

Methods of forming a multi-dimensional array consisting of nanoscale building blocks are described. A two-dimensional periodic array of nanoscale receptors is used as a template by which nanoscale building blocks are weakly captured. A two-dimensional periodicity of the template consisting of nanoscale receptors characterizes a two-dimensional periodicity of nanoscale building blocks captured by the array of nanoscale receptors. The nanoscale building blocks weakly captured by the nanoscale template are subsequently physically transferred onto a foreign substrate by forming strong bindings between the nanoscale building blocks and the foreign substrate, being detached from the nanoscale receptors and resulting in an array of nanoscale building blocks, having a two-dimensional periodicity characterized by the original array of nanoscale template, on the foreign substrate. This transfer technique can be repeated to form three-dimensional array of nanoscale building blocks.

According to this invention it is an object to provide the creation of the variable pre-selected sizes quantum dots on the semiconductor or other substrate appropriate for device fabrication.

DESCRIPTION OF DRAWINGS

The invention will be explained in more detail in conjunction with the appended drawings wherein.

FIGS. 4A to 4E are the schematics showing the alternative way of the formation of a two-dimensional array of nanoscaled building blocks (e.g. quantum dots).

DETAILED DESCRIPTION

Figure 1A:
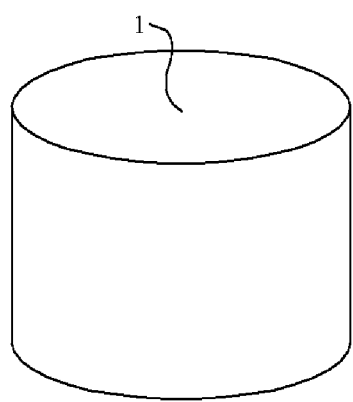
FIG. 1 is the schematics showing the prior art of the formation of nano-scaled building blocks (e.g. quantum dots).
Figure 1B:
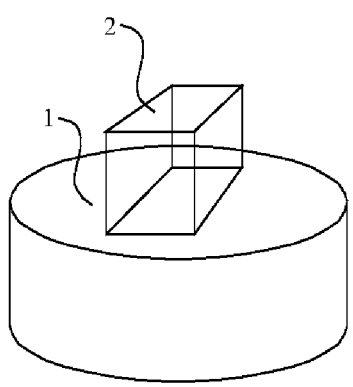
Figure 1C:
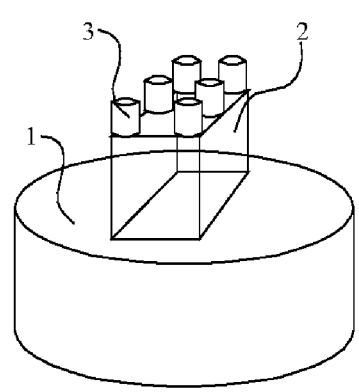
Figure 2A:
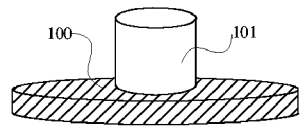
FIGS. 2A to 2E are the schematics showing the formation of a single nano-scaled building block (e.g. single quantum dot).
Figure 2B:
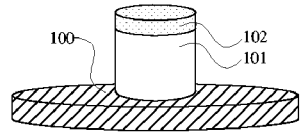
Figure 2C:
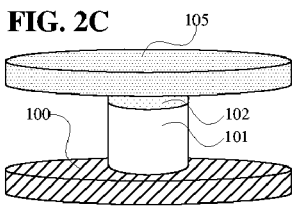
Figure 2D:
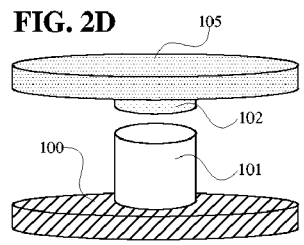
Figure 2E:
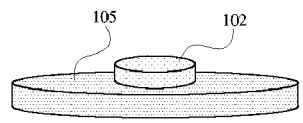

According to a preferred embodiment illustrated in FIG. 2A~2E, a nanoscale receptor 101 is formed on a starting substrate 100. The size of the nanoscale receptor 101 can be in the range of the effective size of an atom (~0.1 nm) up to the size of giant organic or inorganic molecules (~several thousands of nm). The starting substrate 100 on which the nanoscale receptor 101 is formed can be chosen from any preferred organic or inorganic materials that are compatible to the synthesizing processes of the nanoscale receptor 101 and other fabrication processes described in detail infra. Subsequently, as shown in FIG. 2B, the nanoscale receptor 101 captures a nanoscale building block 102. The nanoscale receptor may be made from either an organic or inorganic material. The nanoscale building block can be made from the opposite type of material, or of the same material. Inorganic material can be semiconductors, ceramic, metal, or they are alloy. Organic material can be polymers, biomolecules, or proteins. The nanoscale building blocks may be quantum dots, atoms, nanowires, or molecules. The binding between the nanoscale receptor 101 and the nanoscale building block 102 is strong enough to capture and hold the nanoscale building block 102 at the location of the nanoscale receptor 101, yet it is weak enough to be broken by a competing binding formed in the next process step, in addition, the binding between the nanoscale receptor 101 and the starting substrate 100 is designed to be much stronger than the binding between the nanoscale receptor 101 and the nanoscale building block 102. Then, as illustrated in FIG. 2C, a foreign substrate 105 is brought to close proximity of the nanoscale building block 102 so that the surface of the foreign substrate 105 and the nanoscale building block 102 starts interacting physically, forming a stronger binding than that between the nanoscale receptor 101 and the nanoscale building block 102. The nanoscale building block 102 forming the weak binding with the nanoscale receptor 101 is, then transferred, as in FIG. 2D, to the foreign substrate 105 when the foreign substrate 105 is brought away from the original substrate 100 on which the nanoscale receptor 101 is formed. Finally, as in FIG. 2E, the building block 102 on the foreign substrate 105 is obtained.

Figure 3A:
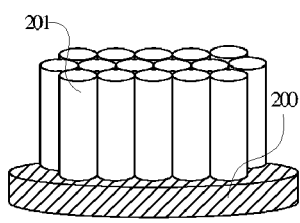
FIGS. 3A to 3E are the schematics showing the formation of a two-dimensional array of nanoscaled building blocks (e.g. quantum dots).
Figure 3B:
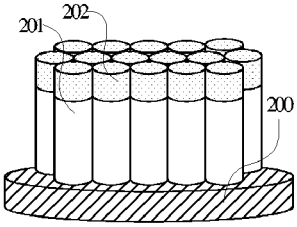
Figure 3C:
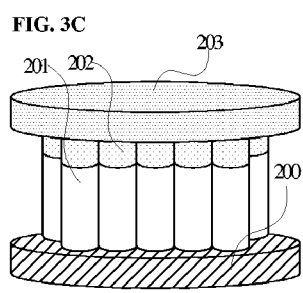

In an alternative preferred embodiment shown in FIGS. 3A~3E, a two-dimensional array of nanoscale receptors 201 is formed on a starting substrate 200. The size of each nanoscale receptor 201 can be in the range as for the nanoscale receptor 101 in FIG. 2, supra. The starting substrates 200 on which the array of nanoscale receptors 201 is formed can be any semiconductor and all kind of polymers, ceramics (mentioned later), or any material compatible with this process as for the starting substrate 100 in FIG. 2, supra. Subsequently, as shown in FIG. 3B, the array of nanoscale receptors 201 captures nanoscale building blocks 202. The nanoscale receptor may be made from either an organic or inorganic material. The nanoscale building block can be made from the opposite type of material, or of the same material. Inorganic material can be semiconductors, ceramic, metal, or they are alloy. Organic material can be polymers, biomolecules, or proteins. The nanoscale building blocks may be quantum dots, atoms, nanowires, or molecules. A specific two-dimensional arrangement of the resulting array comprising nanoscale building blocks 202 represents the specific two-dimensional order of the array of nanoscale receptors 201 formed on the starting substrate 200, i.e. the information on the specific ordered pattern of the two-dimensional array of nanoscale receptors 201 is transferred to the resulting array of nanoscale building blocks 202. Then, as illustrated in FIG. 3C, a foreign substrate 203 is brought to close proximity of the array of nanoscale building blocks 202 so that the surface of the foreign substrate 203 and the surface of nanoscale building blocks 202 on the array of nanoscale receptors 201 starts interacting physically, forming a much stronger binding than that between the array of nanoscale receptors 201 and the array of nanoscale building blocks 202. The array of nanoscale building blocks 202 forming a weak binding with the array of nanoscale receptors 201 is, then transferred, as in FIG. 3D, to the foreign substrate 203 when the foreign substrate 203 is brought away from the original substrate 200 on which the array of nanoscale receptors 201 is formed. As implied here, the strength of the binding between the array of nanoscale receptors 201 and the array of nanoscale building blocks 202 needs to be the weakest among all bindings, i.e. the binding between the array of nanoscale receptors 201 and the starting substrate 200 and the binding between the array of nanoscale building blocks 202 and the foreign substrate 203, involved for this transfer process. As in FIG. 3E, finally the array of nanoscale building blocks 202 transferred onto the foreign substrate 203 is obtained.

Figure 3D:
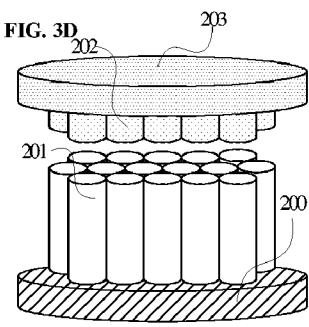
Figure 3E:
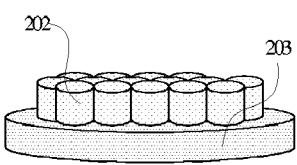

In an alternative preferred embodiment illustrated in FIGS. 4A~4E, unlike the process described with FIGS. 3A~3E supra, instead of transferring an entire array of nanoscale building blocks 202 on an array of nanoscale receptors 201 in FIG. 3D, it would be beneficial that a part of an array of nanoscale building blocks on a starting substrate is transferred on to a foreign substrate. A two-dimensional array of nanoscale receptors 301 in FIG. 4A is formed on a starting substrate 300. The size of each nanoscale receptor 301 can be in the range as for the nanoscale receptor 101 in FIG. 2, supra. The starting substrate 300 on which the array of nanoscale receptors 301 is formed can be any semiconductor and all kind of polymers, ceramics (mentioned later), or any material compatible with this process. Subsequently, as shown in FIG. 4B, the array of nanoscale receptors 301 captures nanoscale building blocks 302 that can be made of a variety of organic or inorganic materials. A specific two-dimensional arrangement of the resulting array comprising nanoscale building blocks 302 represents the specific two-dimensional order of the array of nanoscale receptors 301 formed on the starting substrate 300, i.e. the information on the specific two-dimensional pattern of the two-dimensional array of nanoscale receptors 301 is transferred to the resulting array of nanoscale building blocks 302. Parts of the array of nanoscale building blocks 302 are, then, selectively covered with masks 303 to prevent the specific parts of the array of nanoscale building blocks 302 from being transferred. Then, as illustrated in FIG. 4C, a foreign substrate 304 is brought to close proximity of the array of nanoscale building blocks 302 so that the surface of the foreign substrate 304 and the surface of nanoscale building blocks 302 not covered by the mask 303 on the array of nanoscale receptors 301 starts interacting physically, forming much stronger bindings than those between the array of nanoscale receptors 301 and the array of nanoscale building blocks 302. The array of nanoscale functional building blocks 302 forming a weak binding with the array of nanoscale receptors 301 is, then transferred, as in FIG. 4D, to the foreign substrate 304 when the foreign substrate 304 is brought away from the original substrate 300 on which the array of nanoscale receptors 301 is formed. As implied here, the strength of the binding between the array of nanoscale receptors 301 and the array of nanoscale building blocks 302 is designed to be the weakest among all bindings involved for this transfer process. As in FIG. 4E, finally a part of the array of nanoscale building blocks 302 selectively transferred onto the foreign substrate 304 is obtained.

Figure 5A:
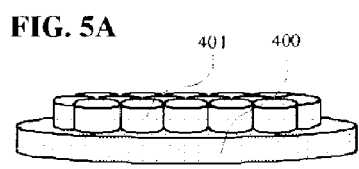
FIGS. 5A to 5G are the schematics showing the formation of a three-dimensional array of nanoscaled building blocks (e.g. quantum dots).
Figure 5B:
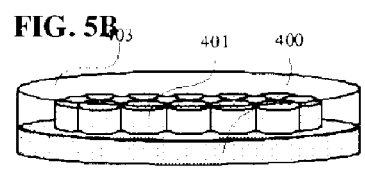
Figure 5C:
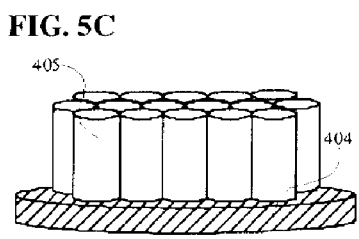
Figure 5D:
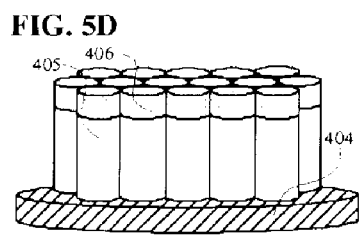
Figure 5E:
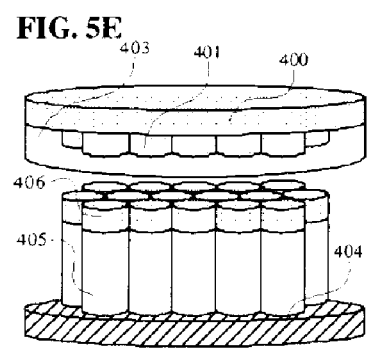
Figure 5F:
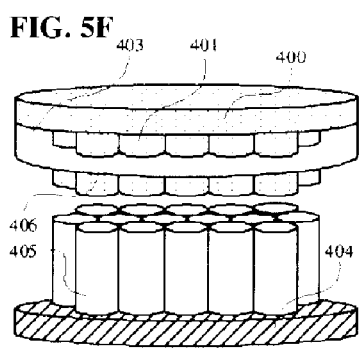
Figure 5G:
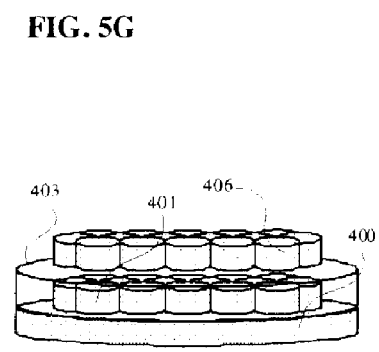

In another preferred embodiment shown in FIGS. 5A-5G, the transfer methods described in FIGS. 2, 3, and 4 supra are repeated as many times as necessary to construct three-dimensional arrayed structures comprising nanoscale building blocks. FIG. 5A illustrates an array of nanoscale building blocks 401 transferred, as in FIG. 3 and FIG. 4, onto a foreign substrate 400, then, in FIG. 5B, the array of nanoscale building blocks 401 is planarized 403 to provide flat surface to the next array of nanoscale building blocks to be transferred. Meantime, as in FIG. 5C, an array of nanoscale receptors 405 is formed on a starting substrate 404. An array of nanoscale building blocks 406 is captured by the array of nanoscale receptors 405. Then, the array of nanoscale building blocks 406 prepared in FIG. 5D is transferred by bringing the planarized array of nanoscale building blocks 403 prepared in FIG. 5B to the close proximity to the array of nanoscale building blocks 406, subsequently, the second array of nanoscale building blocks 406 is transferred on to the planarized array of nanoscale building blocks 403, resulting in multi-level of the array of nanoscale building blocks as shown in FIG. 5G. The transfer process can be repeated as many times as necessary.

Figure 6:
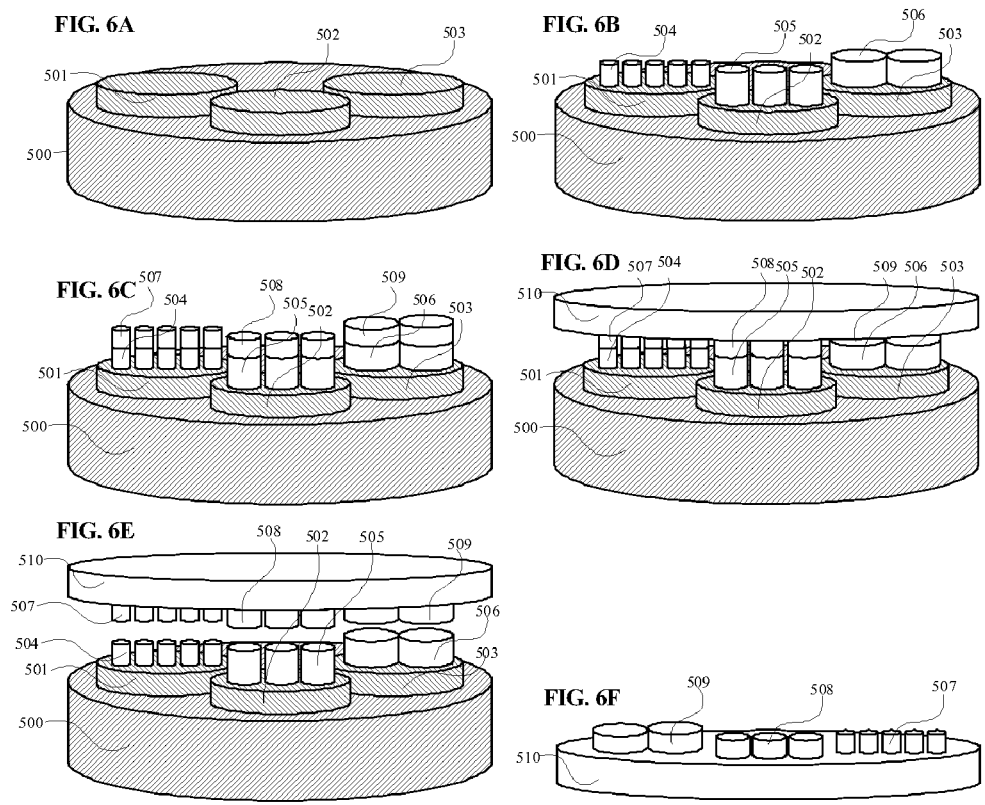
FIGS. 6A to 6F are the schematics showing the method of formation of arrays of different sizes nano-scaled building blocks (e.g. quantum dots).

In other preferred embodiments, several sections 501~503 that are spatially separated each other are pre-formed on a starting substrate 500 as in FIG. 6A. A wide variety of geometrical arrangements, shapes and the number of sections of the pre-formed sections on starting substrates, which are not shown in FIG. 6A, would be apparent to a person skilled in the art in view of the preset disclosure. Each section, then, is filled with nanoscale receptors 504~506, each of which is specifically designed to capture nanoscale building blocks having a specific size as illustrated in FIG. 6B, therefore, the multiple sections 501~503 accommodate the nanoscale receptors 504~506 that can capture a variety sizes of nanoscale building blocks 507~509 as in FIG. 6C. Geometrical arrangement, size and the number of the pre-formed sections and the nanoscale receptors illustrated in FIGS. 6A and 6B are obviously just one example among a wide variety of choices and not limitations. As described in FIGS. 4A-4E supra, in FIG. 6D, a foreign substrate 510 is brought to close proximity of the arrays of nanoscale building blocks 507~509 so that the surface of the foreign substrate 510 and the surface of nanoscale building blocks 507~509 starts interacting physically, forming much stronger binding than that between the array of nanoscale receptors 501~503 and the arrays of nanoscale building blocks 504~506. The arrays of nanoscale building blocks 507~509 forming the weak binding with the arrays of nanoscale receptors 504~506 are, then transferred, as in FIG. 6E, to the foreign substrate 510 when the foreign substrate 510 is brought away from the original substrate 500, leaving the arrays of nanoscale receptors 504~506 formed on the pre-formed sections 501~503 on the original substrate 500. Finally, as in FIG. 6F, the arrays of different pre-designed quantum dots with selected location can be formed.

Figure 7:
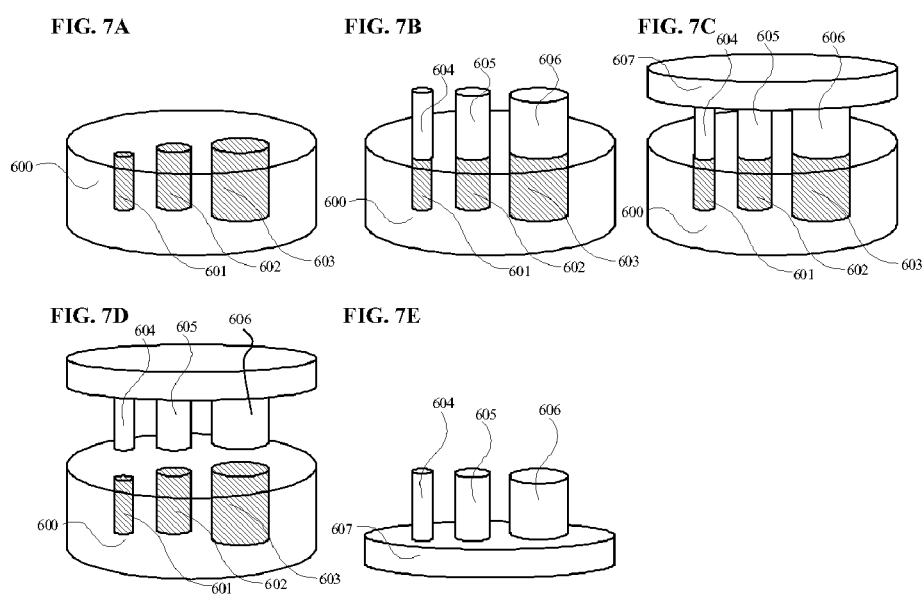
FIGS. 7A to 7E are the schematics showing the method of formation of arrays of different sized nanoscaled building blocks (e.g. quantum dots).

In an alternative preferred embodiment illustrated in FIGS. 7A-7E, nanoscale receptors having a variety of sizes 601~603 can be varied in a starting substrate 600 in such a way that the surface of the nanoscale receptors 601~603 can be at a variety of levels with respect to that of the surface of the starting substrate 600. By way of an example and not way of limitation, the surface of nanoscale receptors 601~603 can be at the same level the surface of the original substrate 600 is at as shown in FIG. 7A. In FIG. 7A, the nanoscale receptors 601~603 can be simply geometrical indentations formed on the starting substrate 600 as well as nanoscale receptors 601~603 consisting of dissimilar materials to the starting substrate 600. A wide variety of geometrical arrangements, shapes and the number of nanoscale receptors 601~603 buried in the starting substrate 600, which are not shown in FIG. 7A, would be apparent to a person skilled in the art in view of the present disclosure. As in FIG. 7B, nanoscale building blocks 604~606 are, then, formed on the nanoscale receptors 601~603. As in FIG. 7C, a foreign substrate 607 is, then, brought to close proximity of the surface of the nanoscale functional building blocks 604~606 so that the surface of the foreign substrate 607 and the surface of nanoscale building blocks 604~606 starts interacting physically, forming much stronger bindings than those between the array of nanoscale receptors 601~603 and the nanoscale building blocks 604~606. The nanoscale building blocks 604~606 forming weak bindings with the nanoscale receptors 601~603 are, then transferred, as in FIG. 7E, to the foreign substrate 607 when the foreign substrate 607 is brought away from the original substrate 600, leaving the nanoscale receptors 601~603 formed on the original substrate 600.

According to this invention, the nano-scaled blocks can be quantum dots, atoms, or molecules on the substrate or the layer of the materials. For example, CdSe quantum dots can be formed using the organic receptor like protein template and can be transferred to the foreign substrate (e.g. ZnS) or to the layer of material (e.g. ZnS layer) to form the quantum dot based optical devices. Arrays of single layered quantum dots or three-dimensional quantum dots can be formed to enhance the device performance.

According to this invention, the nano-scaled blocks can be transferred to the foreign substrate or to the layer of foreign material. The foreign substrate or the layer of material can be any semiconductor such as Si, Ge, InP, GaAs, ZnS, CdTe, ZnCdTe etc. The substrate can cover also all kinds of polymers or ceramics such as AlN, Silicon-oxide etc.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

The present invention is expected to be found practically use in the novel device fabrication using the substrate whereon the quantum-dots formation is not possible using the conventional techniques as mentioned in the prior art. The proposed invention can be used for fabricating wide display, imaging devices, low threshold laser, quantum confinement devices (optical and electronics) etc.

What is claimed is:

1. A method of producing at least one nanoscale building block comprising the steps of:
    creating, at least one receptor on a substrate, wherein the at least one receptor having a diameter and a height that are substantially between 0.1 nm and 5000 nm, projects above the substrate;
    creating, at least a first nanoscale building block on the at least one receptor;
    attaching, the first nanoscale building block to a foreign substrate by placing the foreign substrate in contact with the first nanoscale building block;
    separating, the first nanoscale building block from the at least one receptor such that the first nanoscale building block remains attached to the foreign substrate and not to the at least one receptor.

2. A method of producing one or more nanoscale building blocks, said method comprising the steps of:
    creating, at least one receptor on a substrate;
    creating, a first nanoscale building block on the at least one receptor;
    attaching, the first nanoscale building block from the at least one receptor such that the first nanoscale building block remains attached to the foreign substrate after said separating step from the at least one receptor is complete;
    creating, a second nanoscale building block on the at least one receptor;
    attaching, the second nanoscale building block to the foreign substrate in a different position from the first nanoscale building block and separating, the second nanoscale building block from the at least one receptor, such that the first and second nanoscale building block remains attached to the foreign substrate and are no longer connected to the at least one receptor.

3. A method of producing one or more nanoscale building blocks, said method comprising the steps of:
    creating, at least one receptor on a substrate;
    creating, a first nanoscale building block on the at least one receptor;
    attaching, the first nanoscale building block to a foreign substrate;
    separating, the first nanoscale building block from the at least one receptor such that the first nanoscale building block remains attached to the foreign substrate after the separating step from the at least one receptor is complete;
    creating, a second nanoscale building block on the at least one receptor; and
    attaching, the second nanoscale building block a different foreign substrate such that after separating the second nanoscale building block from the at least one receptor, the second nanoscale building block remains attached to the different foreign substrate.

4. The method of claim 2 wherein the substrate is ZnS, the at least one receptor is an organic material, the nanoscale building block is CdSe, and the foreign substrate is ZnS.

5. A method of producing one or more nanoscale building blocks arranged in one or more layers, said method comprising the steps of:
    creating, at least one receptor on a substrate;
        creating, a first nanoscale building block on the at least one receptor;
        attaching, the first nanoscale building block to a foreign substrate;
        separating, the first nanoscale building block from the receptor such that the first nanoscale building block remains attached to the foreign substrate; and
    adding, a subsequent layer of nanoscale building blocks, said step of adding effected through the steps of;
        covering, the first nanoscale building block completely with an additional material,
        creating, a second nanoscale building block on the at least one receptor,
        attaching, the second nanoscale building block to the layer of the additional material, and
        separating, the second nanoscale building block from the at least one receptor such that the second nanoscale building block remains attached to the additional material, and is no longer connected to the at least one receptor,
    wherein said step of adding is repeated to add a desired number of subsequent layers of nanoscale building blocks.

6. A method of producing an array of nanoscale building blocks comprising the steps of:
    creating, at least one group of receptors arranged in accordance with a desired array pattern on a substrate;
    creating, a first group of nanoscale building blocks on the at least one group of receptors;
    attaching, the first group of nanoscale building blocks to a foreign substrate by placing the foreign substrate in contact with the nanoscale building blocks;
    separating, the first group of nanoscale building blocks from the at least one group of receptors such that the first group of nanoscale building blocks remain attached to the foreign substrate and not to the at least one group of receptors,
    wherein the nanoscale building blocks on the foreign substrate is arranged in accordance with the desired array pattern.

7. The method of claim 2 wherein the diameter of all the receptors are substantially the same.

8. The method of claim 6 wherein the at least one group of receptors are created selectively, such that some fraction of the first group of nanoscale building blocks created on said selectively created receptors exhibit a diameter and a height that are one selected from a group consisting of less than 500 nm, greater than 500 nm and a combination thereof.

9. The method of claim 6 wherein said step of attaching the first group of nanoscale building blocks to the foreign substrate is proceded by a step of selectively covering predetermined sections of first group of nanoscale building blocks with a layer of an additional material such that only the predetermined sections of the first group of nanoscale building blocks are selectively attached to the foreign substrate in said attaching step.

10. A method of producing a three dimensional array of nanoscale building blocks, said method comprising the steps of:
creating, at least one group of receptors on a substrate;
creating, a first group of nanoscale building b locks on the at least one group of receptors;
attaching, the first group of nanoscale building blocks to a foreign substrate; and
separating, the first group of nanoscale building blocks from the at least one group of receptors such that the first group of nanoscale building blocks remain attached to the foreign substrate,
adding, a subsequent layer of nanoscale building blocks, said adding step effected through the steps of;
covering, the first group of nanoscale building blocks on the foreign substrate completely with an additional layer;
creating, a second group of nanoscale building blocks on the at least one group of receptors,
attaching, the second group of nanoscale building blocks to the additional layer, and
separating, the second group of nanoscale building blocks from the at least one group of receptors thereby, creating a three dimensional array of nanoscale building blocks,
wherein said step of adding is repeated to add a desired number of subsequent layers of nanoscale building blocks such that the three dimensional array of nanoscale building blocks is attached to the foreign substrate and is no longer connected to the at least one group of receptors.

11. A method of producing multiple arrays of nanoscale building blocks, said method comprising the steps of:
creating, at least one group of mesa structures on a substrate;
creating, at least one group of receptors on each mesa structure, wherein each group of receptors includes one or more receptors;
creating, a first group of nanoscale building blocks on the at least one group of receptors;
attaching, the first group of nanoscale building blocks to a foreign substrate by placing the foreign substrate in contact with the nanoscale building blocks;
separating the first group of nanoscale building blocks from the at least one group of receptors such that the first group of nanoscale building blocks remains attached to the foreign substrate and not to the at least one group of receptors.

12. A method of producing a multiple layer three dimensional array of nanoscale building blocks, said method comprising the steps of:
creating, at least one group of mesa structures on a substrate;
creating, at least one group of receptors on each mesa structure, wherein each group of receptors includes one or more receptors;
creating, a first group of nanoscale building blocks on the receptors;
attaching, the first group of nanoscale building blocks to a foreign substrate; and
separating, the first group of nanoscale building blocks from the receptors such that the first group of nanoscale building blocks remains attached to the foreign substrate;
adding, a subsequent layer of nanoscale building blocks, said adding step effected through the steps of;
covering, the first group of nanoscale building blocks on the foreign substrate completely with an additional layer,
creating, a second group of nanoscale building blocks on the at least one group of receptors,
attaching, the second group of nanoscale building blocks to the additional layer, and
separating, the second group of nanoscale building blocks from the at least one group of receptors thereby, creating a three dimensional array of nanoscale building blocks on the foreign substrate,
wherein said step of adding is repeated to add a desired number of subsequent layers of nanoscale building blocks such that the three dimensional array of nanoscale building blocks is attached to the foreign substrate and is no longer connected to the at least one group of receptors.

13. The method of claim 12 wherein the receptors in each of the group of receptors on each of the mesa structures are of a different size.

14. The method of claim 12 wherein, in the three dimensional array, the at least one group of receptors is organized in arrays that are one selected from a group consisting of substantially similar array patterns and different array patterns and wherein, in said adding step additional layer is further separated by a layer comprised of a material that is one selected from a group consisting of the substrate material, a polymer, a ceramic, an insulator and a conducting material.

15. The method of claim 12 wherein, in said adding step at least one of the additional layer is further separated by an intermetallic layer.

16. The method of claim 12 wherein the step of creating at least one group of receptors is effected through mechanical strain in the at least one group of mesa structures thereby providing energetically preferred receptors for creating the first group of nanoscale building blocks.

* * * * *